(12) United States Patent
Qvarfordt et al.

(10) Patent No.: US 8,194,630 B2
(45) Date of Patent: Jun. 5, 2012

(54) METHOD AND SYSTEM FOR INTERFERENCE REDUCTION THROUGH PROXIMITY BASED TRANSMISSION MODE CHANGE

(75) Inventors: Christer Qvarfordt, Kista (SE); Henrik Olofsson, Kista (SE); David Sandberg, Kista (SE); Johan Johansson, Kista (JP); Michael Roberts, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 321 days.

(21) Appl. No.: 12/607,620

(22) Filed: Oct. 28, 2009

(65) Prior Publication Data

US 2010/0061356 A1    Mar. 11, 2010

Related U.S. Application Data

(63) Continuation of application No. PCT/CN2007/001427, filed on Apr. 28, 2007.

(51) Int. Cl.
*H04W 4/00* (2009.01)
*H04L 12/28* (2006.01)
*H04Q 7/20* (2006.01)

(52) U.S. Cl. ......... 370/338; 370/392; 455/436; 455/458

(58) Field of Classification Search ..... 370/331–395.53; 455/414.1, 418–458
See application file for complete search history.

(56) References Cited

U.S. PATENT DOCUMENTS

| 7,346,361 B2 * | 3/2008 | Kang et al. ............... 455/458 |
| 2006/0189318 A1 | 8/2006 | Kang et al. |
| 2007/0058588 A1 | 3/2007 | Fashandi et al. |
| 2007/0066273 A1 * | 3/2007 | Laroia et al. ............ 455/343.2 |
| 2007/0115884 A1 * | 5/2007 | Shang et al. ............... 370/331 |

FOREIGN PATENT DOCUMENTS

| CN | 1622677 A | 6/2005 |
| CN | 1930793 A | 3/2007 |
| WO | WO 01/41478 A1 | 6/2001 |

OTHER PUBLICATIONS

1st Office Action in corresponding Chinese Application No. 200780000732.9 (Mar. 3, 2011).

(Continued)

*Primary Examiner* — Afsar M. Qureshi
(74) *Attorney, Agent, or Firm* — Leydig, Voit & Mayer, Ltd.

(57) ABSTRACT

A method for transmission mode change in a telecommunication network, said network having a public network comprising at least one public base station (NB) covering a public cell and a private network comprising at least one private base station (PBS) covering a private cell, wherein said at least one private base station has limited access rights for User Equipment (UEs) in the private network, and where said UEs are able to also communicate with the public network, comprising the step of: performing a private base station transmission mode change when the private base station is in an interference reduction transmission mode to an active transmission mode when a UE with access right to said private base station is detected in proximity of said private base station, where a detection of said proximity is based on information being specific for said UE and its relation to said private base station. The disclosure also relates to a telecommunication system.

20 Claims, 3 Drawing Sheets

OTHER PUBLICATIONS

1st Office Action in corresponding Korean Application No. 10-2009-7021739 (Jan. 15, 2011).

State Intellectual Property Office of the People's Republic of China, English Translation of Written Opinion of the International Searching Authority in International Patent Application No. PCT/CN2007/001427 (Feb. 14, 2008).

European Patent Office, Extended European Search Report in European Patent Application No. 07721000.3 (Jun. 28, 2010).

Anonymous, "Method to Increase Power Efficiency in a Mixed GSM/UMTS Network," Research Disclosure, Mason Publications, vol. 471, No. 88, XP007133045 (Jul. 1, 2003).

Global System for Mobile Communications, "GSM Cordless Telephony System (CTS), Phase 1; Service Description; Stage 1 (Release 6)," $3^{rd}$ Generation Partnership Project, Technical Specification Group Services and System Aspects, 3GPP TS 42,056 v6.0.0 (Jan. 2005).

Orange, Telecom Italia, T-Mobile, Vodafone, "Requirements for the Home eNodeB Deployment," 3GPP TSG RAN WG2#57, R2-070817 (Feb. 2007).

Orange, Telecom Italia, T-Mobile, Vodafone, "Requirements for LTE Home eNodeBs," 3GPP TSG RAN #35, RP-070209 (Mar. 2007).

1st Office Action in corresponding European Application No. 07721000.3 (Oct. 12, 2011).

Korean Intellectual Property Office, Final Office Action in Korean Patent Application No. 10-2009-7021739 dated Sep. 26, 2011 (5 pages).

* cited by examiner

METHOD AND SYSTEM FOR INTERFERENCE REDUCTION THROUGH PROXIMITY BASED TRANSMISSION MODE CHANGE

CROSS-REFERENCE TO RELATED APPLICATIONS

This application is a continuation of International Patent Application No. PCT/CN2007/001427, filed Apr. 28, 2007, the content of which is hereby incorporated by reference in its entirety.

FIELD OF THE TECHNOLOGY

The present disclosure relates to a method and a system for interference reduction through proximity based transmission mode change in a telecommunication network.

BACKGROUND OF THE DISCLOSURE

The development of the wireless communication standards for UTRAN (Universal Terrestrial Radio Access Network) and enhanced UTRAN (also called LTE—Long Term Evolution) in 3GPP (3rd Generation Partnership Program) is progressing and during this time the need for small home premise equipments, i.e., private radio base stations containing at least Radio Base Station functionality, typically for very small cells, so called femto cells or pico cells, has emerged.

A problem when introducing private radio base stations in a telecommunication system is that the transmission of common channels such as BCH in the telecommunication system will result in interference between adjacent cells of adjacent radio base stations as the number of nodes in the system may increase to a point where the management of the system will not be possible to plan and control for a network operator, such as by having explicit neighbour lists sent down from a cell as it is done in UTRAN today. Also, in systems where a home owner may own a radio base station for a very small cell, the management of the system will be not possible to plan and control for a network operator as home owners cannot be expected to perform the same complex network planning and configuration of the radio base stations as a network operator would do. Further, in current systems the cells that are neighbouring to a specific cell are explicitly signalled to the UEs to enable the UEs to find suitable cells to measure and use for mobility. In current networks there is a neighbour cell list (NCL) that could also define this. In a system with a high density of small cells, the list of neighbouring cells will become too large to handle and especially with many small cells with limited access rights the list have to be different for different UEs. It is therefore not feasible to identify the UE being close to a small base station by this means.

In GSM systems the Cordless Telephony System (CTS) system has been addressing the support for having small equipment for usage at home. However, the CTS-system has only one BCH transmission mode, i.e., the active mode.

SUMMARY

This disclosure provides a method and a telecommunication system where the interference to other base stations from a private base station without UEs connected thereto is reduced, thereby increasing the ability to read the cell information of the other base station cells when getting close to a non-used private base station.

The method for transmission mode change in a telecommunication network, wherein a public network comprises at least one public base station (NB) covering a public cell and a private network comprises at least one private base station (PBS) covering a private cell, wherein said at least one private base station has limited access rights for User Equipments (UEs) in the private network, and where said UE:s are able to also communicate with the public network, comprising the step of, when the private base station is in an interference reduction transmission mode, performing a private base station transmission mode change to an active transmission mode when a UE with access right to said private base station is detected in proximity of said private base station, where a detection of said proximity is based on information being specific for said UE and its relation to said private base station.

The system is in a telecommunication network, said network having a public network comprising at least one public base station (NB) covering a public cell and a private network comprising at least one private base station (PBS) covering a private cell, wherein said at least one private base station has limited access rights for User Equipment (UEs) in the system, and where said UEs are able to also communicate with the public network; and the system has means for receiving a proximity indicator triggering a mode change of the private base station from an interference reduction transmission mode to an active transmission mode when an UE with access right to said private base station is detected in proximity of said private base station, where a detection of said proximity is based on information being specific for said UE and its relation to said private base station.

The disclosure will now be described in more detail below with reference to the appended drawings which illustrate embodiments of the method according to the disclosure.

BRIEF DESCRIPTION OF THE DRAWINGS

FIG. 2 shows schematically an example of what cell relation information storage can look like;

DETAILED DESCRIPTION OF THE DISCLOSURE

The same reference numerals are being used for similar features in the different drawings.

Although 3GPP UTRAN and eUTRAN are used as model technologies in this application, the embodiments described herein can be applied to any radio access technology.

The development of the wireless communication standards for UTRAN (Universal Terrestrial Radio Access Network) and enhanced UTRAN (eUTRAN, also called LTE—Long Term Evolution) in 3GPP (3rd Generation Partnership Program) is progressing and during this time the need for small home premise equipments, i.e., private radio base stations, has emerged. A private base station contains at least Radio Base Station functionality, typically for very small cells, so called femto cells (or pico cells). For the purpose of this application, the private base station concept includes all kinds of small Radio Base Station equipments (e.g. office) and secondarily it may include also traditional kind of Radio Base Station Equipments for wider area coverage.

As home owners cannot be expected to perform the same complex network planning and configuration of the radio base stations as a network operator would do it is required that the private base stations can be autonomously configured from the home owner's viewpoint.

Figure 1:
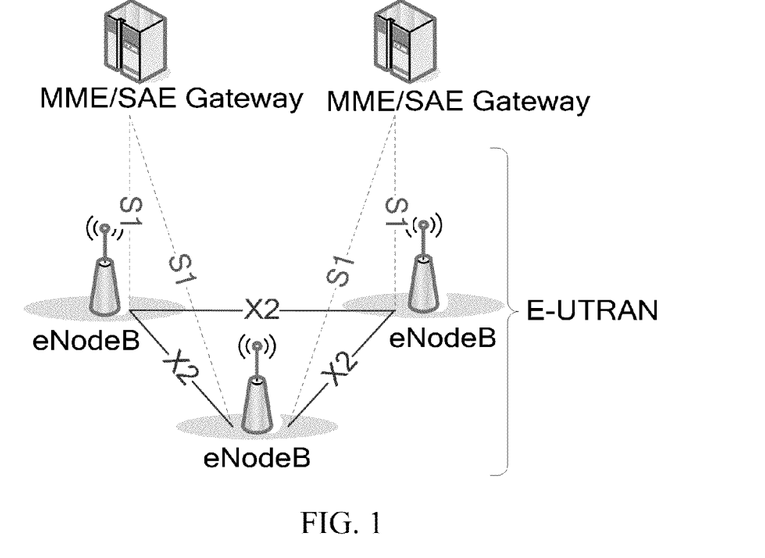
FIG. 1 shows schematically an example of a 3G eUTRAN architecture.

FIG. 1 shows schematically an example of a 3G eUTRAN architecture. The architecture of eUTRAN is simplified compared to UTRAN. In eUTRAN, as can be seen in the figure, a central RNC node controlling multiple NodeB:s does not exist. Instead, only two types of nodes are defined, eNodeBs (Radio nodes) and MME/SAE Gateways (Access Gateways), where the eNodeB belongs to the evolved UTRAN (E-UTRAN) network and the MME/SAE Gateway belongs to the evolved packet core network (EPC) and where there exists an X2 interface between two eNodeBs and an S1 interface between an eNodeB and an MME/SAE Gateway. A similar architecture is also used for UMTS, especially when looking at the evolution of the HSPA system where the RNC and NodeB are collapsed to one node.

When introducing private base stations in the system, possibly on the same carrier frequency as the normal cellular network, the interference will be more unplanned than in conventional cellular networks, since the interference situation will differ depending on where the private base station is placed in the home of the owner.

One common idea with private base stations is to have a limited access right to the private base station for the UEs defined by the user who owns the equipment or which UE belongs to a selected group of UEs. This is how it is done in the WLAN routers that are normally used in today's systems, where the owner selects who will be given access to its router by giving out ciphering keys to the invited UEs.

According to the disclosure, the private base station shall be able to adapt/minimize the output power of the radio transmitter depending on whether suitable UEs are in the vicinity, and/or whether to transmit common channels in the cell(s), e.g., whether to transmit the PCH (Paging Channel) or BCH (Broadcast Channel) in the cell. The BCH is used for the eNodeB in E-UTRAN to identify itself for UEs roaming in the area and contains information regarding the access information in the E-UTRAN cell. The BCH is transmitted on specific resources in E-UTRAN. There are no big differences for a UTRAN system, where the BCH is used in a similar way. The BCH is transmitted on a specific channelization code in UTRAN.

In UTRAN and E-UTRAN systems the network is aware of the presence of UEs in idle mode through Routing and Tracking Area respectively. This is used to find a suitable balance between the size of the area that a UE has to be paged in and the signalling load caused by the UE to make the network aware of the position. The signalling is done by a NAS (Non Access stratum) message called RAU (Random Access update) or TAU (Tracking Area update) in UTRAN and E-UTRAN respectively.

For UEs in active mode the network is aware of the presence of them on a cell basis.

According to the disclosure, it is assumed that if a private base station reduces its transmission in a cell, other nearby radio transmissions on same or overlapping frequencies can benefit from this, e.g., transmissions involving nearby private base stations, or involving overlaid public cells such as macro or umbrella cells. Benefits would come in terms of higher spectrum efficiency or higher achievable data throughputs or better radio link robustness or a combination of these.

According to the embodiment of the disclosure, the main problem and solution idea is to reduce private base station interference by reducing transmitted power for common channels such as BCH, PCH for said private base station when they are not needed. When reducing the transmission power of the common channels, such as BCH, the possibility for the UEs to find the cell will be decreased. This can be both a problem and a benefit. Specifically, that is one of the benefits when having restricted access groups of UEs to a specific private base station, as it is likely to exist long periods of time when there is no UE belonging to the said restricted access group present in the vicinity of the private base station during which the interference to the system can be minimized. When the BCH is put in interference reduction mode, the mobility control of the UEs in the system is limited or even disabled, as UEs can no longer receive mobility control information by the BCH of the private base station. However, in a UMTS system there will be UEs that only support earlier releases of the standards, i.e., which are not aware of any restricted access groups. These UEs will then camp on the private base station cell in idle mode, whether or not they are included in the restricted user group or not. When the BCH is put in interference reduction mode the cell will suddenly disappear as for these UEs and they will have to re-select to another cell.

In another case, if the operator wants to use the private base stations to de-load the public network, e.g., when no preferred UEs are in the private base station cell, the power of the BCH has to be turned on well in time for the UEs in public domain to measure the BCH of the cell.

A private base station uses a set of transmission modes, at least two—active mode and interference reduction mode. The private base station uses a proximity indication as input to switch between the different modes, which modes will be described more in detail below.

The benefit is a substantially reduced interference while still preserving the characteristics required to support mobility, reducing unnecessary overhead and improving the radio environment for other nearby radio transmissions on overlapping frequencies, increasing total spectrum efficiency, and radio link characteristics for the other nearby radio transmissions.

In current systems the BCH has to be continuously transmitted from a base station. The transmission power of the BCH is defining how far away from the base station it can be heard by a UE, defining the control channel coverage in downlink. The BCH is the main source of interference from a cell where all UEs are idle. In this application, the definition of BCH comprises all logical control information broadcast and also broadcast pilot transmissions and broadcast synchronization information (sometimes referred to as SCH—synchronization channel), and any additional low level control broadcast needed to transmit/receive any of the former kinds of data.

The interference reduction of the different transmission modes can be obtained either by having a periodic interval between BCH transmissions, known as Discontinuous Transmission (DTX), or in a special case the transmission power may be completely turned off. The benefit of applying DTX is that the coverage of the private base station cell could be "normal," still reducing interference, at the low cost of longer times for a UE to reselect to the cell. Also, this could give very good interference reduction when no UE is in the cell, applying very long DTX idle periods. When UEs are using the cell, in active or idle mode, DTX intervals could be shortened, to limit the impact to mobility requirements.

In particular when UEs are using the cell, in idle or active modes, UE sleep periods (DRX—Discontinuous reception) could be synchronized with private base station DTX, in order to optimize both UE battery power and interference from private base station common channel transmission.

In particular, if the private base station DTX timing is known to a UE, it could detect the private base station cell by trying to receive private base station BCH only when this is sent. This is proposed to be achieved by the UE deducing private base station radio frame synchronization by synch information in neighbouring cells, either from neighbouring private base stations, or from an overlaid network. The synch information could be BCH information telling if the private base station is in synch with current cell or not, possibly providing offset information, in case the private base station is synchronized with the reference cell, but transmission frame boundaries are not aligned. Furthermore, in order to spread and randomize interference, the exact private base station DTX timing could be determined by applying another offset from the synch reference, the offset being determined by a hash function on a known value that relates to the particular private base station or private base station cell, e.g., a unique Cell identity. This way, the interference can be randomized, without having to burden the BCH of the reference cell with this information (this could be a quite significant saving, as there could be 100's of private base stations within the coverage of a macro cell, which is the most obvious reference cell).

Alternatively, a UE having accessed the particular private base station could remember its frame synch offset, relating to e.g. an overlaid network.

The interference could also be reduced by a transmission mode that uses a different lower maximum transmission power on the BCH than in "normal," i.e., active, mode. The benefit of this approach could be that it works also with legacy UEs, i.e. UEs of previous versions of a standard, that assume that BCH is continuously transmitted. The private base station could be brought into "normal," i.e., active, transmission state, by simply having a UE placed very near the private base station, to select it, and to bring it into operation. Any combination of these methods, e.g. having DTX and power reduction is naturally also possible.

In particular, the private base station is proposed to have different transmission modes for interference reduction for legacy UEs, and other more efficient modes for newer UEs, i.e., UEs supporting the method according to the disclosure described herein. When using a restricted, or closed, user group, the private base station is proposed to apply different transmission modes depending on the capabilities and maturity of UEs of the restricted user group.

Furthermore, the private base station may store a history of which kind of UEs that are most frequently using the private base station, and select the most optimal transmission mode based on the capabilities and maturity of those UEs. This approach could be applied also for the non-closed user group case.

In one specific mode of the interference reduction states, the power of the BCH could be ramped up from its current power level during consecutive transmission occasions until a specific UE responds to the private base station or a maximum transmission power is reached. This is the same method as is used for RACH procedure in the uplink in UTRAN and E-UTRAN and it could be used for the UE detecting the proximity of the private base station. It could also be used for measurements of the coverage situation in the network. When the UE detects the cell it informs the private base station either via a direct radio link or via the currently used cell which relays the information to the private base station.

The proximity could be detected by the UE, the private base station, the network or by other means. If not detected by the private base station itself, it needs to be indicated to the private base station.

A proximity indication is an indication that a UE that can use the private base station (in any way, for camping, for active mode sessions or both), is getting close to a private base station cell, or has entered the coverage of a private base station cell.

Different proximity detection mechanisms could be hierarchical, a coarse proximity mechanism could trigger the usage of a more fine-grained mechanism etc., for example, when recognizing a location area/tracking area/routing area, a GPS location application for fine-grained positioning could be started.

The UE could detect proximity to a private base station that it can use, based on storing and recognizing information regarding cells that are neighbours to or in the vicinity of the particular private base station cell, i.e. the UE would store cell information and cell relations between the private base station and other cells in the surroundings. This information can be stored in the SIM card of the UE or in another storage facility in the UE. The UE could build this information by reading information from the nearby cells, while camping on the private base station cell, or while leaving the private base station cell. Alternatively, the network could provide this information to the UE based on an O&M network model.

Alternatively, the UE could detect proximity to a private base station that it can use, by a location application, e.g., GPS location.

Alternatively, the UE could detect proximity by another UE application, such as recognizing a known short range radio network, e.g., Bluetooth or WLAN network, or by just running a particular UE application. This could be beneficial e.g. in cases when the UE is used also as a remote control to open garage or the front door etc.

Figure 2:
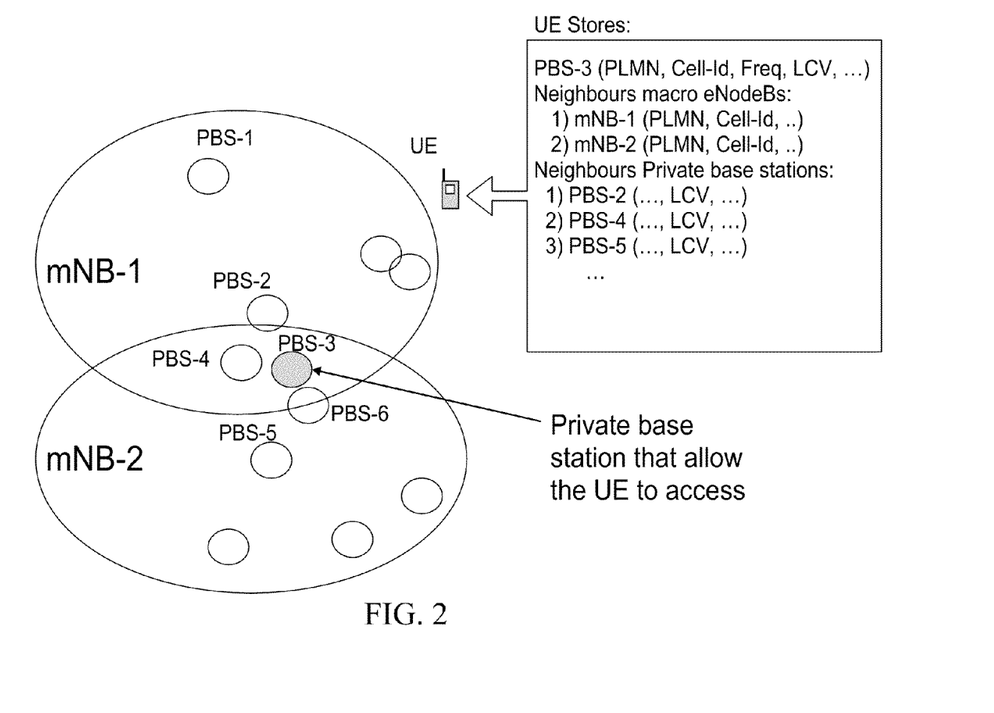

FIG. 2 shows schematically an example of how cell relation information storage can look like. When the UE detects proximity to a private base station PBS that it can access, e.g. by recognizing the surrounding cells, e.g., through the cell identity or the logical cell value, that are near this particular private base station, the UE need to notify the private base station that it is nearby to trigger a private base station transmission mode change, to make it possible to find and access the particular private base station cell. This could be done through the wireless network, i.e., the UE doing a control plane procedure (e.g., a cell/tracking area update), towards a cell where the UE is when it detects the proximity, with a particular value of a particular information element, indicating proximity to a private base station that the UE can use. Also, for simple network implementation, the address of the particular private base station or private base station cell could be provided by the UE, e.g., a unique cell identity. The network would then in turn indicate to the private base station to change transmission mode.

Another alternative is that the UE indicates directly to the private base station that it is present, e.g., by an RACH procedure. This requires however that the UE can in some way detect, find and measure the private base station cell, despite the private base station being in a reduced interference transmission mode, possibly by knowing the timing details of the private base station DTX, as mentioned above, or by applying extremely long detection and measurement times, matching the private base station DTX. In this case, the proximity indication internally in the UE would trigger the UE to start looking for the private base station cell, when the UE gets near the private base station.

Cell relation information may, wherever it is stored, include information relating to at least one private cell covered by a private base station to which said UE has access rights, and optionally at least one neighboring private cell and/or at least one neighboring public cell, where cell information may include one of the following: a Logical Cell Value (LCV), a frequency, a Cell-ID, or a Public Land Mobil Network (PLMN).

Figure 3:
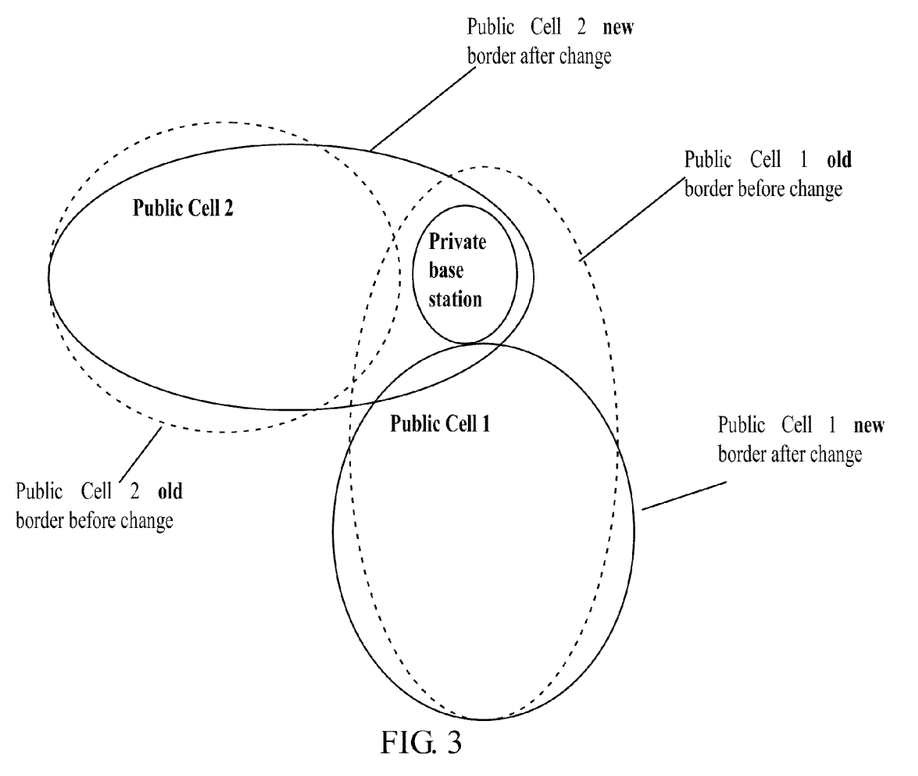
FIG. 3 shows schematically an example of when the cell relations between the cell(s) covered by the private base station and the cells in the public network changes.

FIG. 3 shows schematically an example of when the cell relations between the private base station and the cells in the public network also changes whenever there is a need to update the cell plan of the public network, either due to additions of new cells or other cell layout reconfigurations. The UE uses the cell relation information to generate the proximity indication to the private base station, but since the cell layout has changed the UE never generates the proximity indication and the private base station is never activated.

In an embodiment of the disclosure the cell information broadcast from the cells after the cell layout reconfiguration is containing both the new cell information and also cell information about its previous information. This extra information could be used for a period of time, so that the UEs can understand that they should update their cell relation information.

In case the UE does not obtain the extra information during this period of time, it might have to manually select the private base station and then update the cell relation information. This could also be used when the owner has moved the private base station to another place in the home/building which also could change the cell relations.

Figure 4:
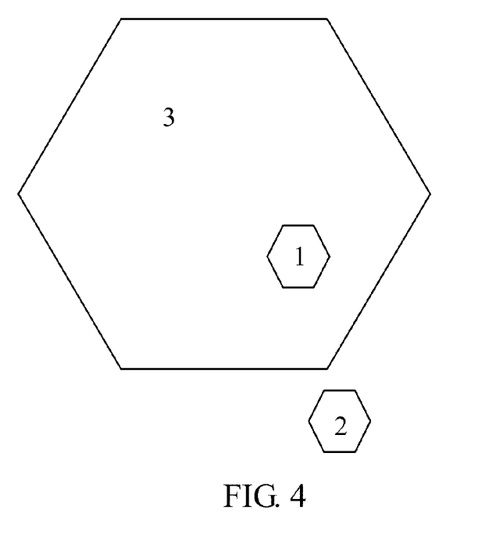
FIG. 4 shows schematically a difference in requirements depending on whether the private base station is covering the same area as the larger normal cells or if the coverage is completely separated.

As shown in FIG. 4, there is a difference in requirements depending on whether the private base station is covering the same area as the larger normal cells or if the coverage completely separate. An example of this is shown in the figure where there are two cells covered by private base stations (cell 1 and cell 2) and a public cell (cell 3). When a private base station is having no coverage relation to the surrounding cells (as cell 2), we call it "out of service." This could for example be a scenario where the private base station is placed in the basement of a house.

In the most common situation the private base station will have overlapping coverage with the surrounding cells (as cell 1). We call that "in service." This is the situation where the reduced interference from the common channels would be the most beneficial. A problem is when a cell is "out of service" and the UE is turned off, e.g., in a bedroom in the basement only covered by the private base station where the private base station would possibly go into interference reduction mode since no UE is available. When the UE is powered up in the morning there is no cell available to find and therefore it is suggested that the UE send a wake up message directly to the private base station.

This message could be a normal random access burst, with a specific preamble, that the private base station shall be listening to and when received the private base station shall go in to normal operation. Another aspect of "out of service" is that the benefit of interference reduction is gone and therefore this information could be used to select if or which mode to apply.

UE based proximity detection and indication is particularly beneficial when UE is in Idle Mode, as UE mobility is anyway handled by the UE in Idle mode. The network knows the location of the Idle UE only on coarse granularity, on tracking area/routing area/location area basis, and cannot say very exactly when a UE is close to a private base station. There could be many private base stations in the geography of a tracking area that this particular UE can use. The UE on the other hand knows its "position" on finer granularity, on cell level and can provide a more accurate proximity indication.

UE based proximity detection could also be used in active mode, meaning that the UE would report detected proximity to the network, possibly by the same procedure as used in Idle mode, possibly by another procedure, e.g., a mobility measurement report, that is anyway sent regularly in Active Mode. The main benefit of using UE based proximity detection also in active mode would be reduced network complexity due to reusing the same functionality for active and Idle mode UEs.

In another embodiment of the disclosure, the proximity indication can be initiated by a node in the network. The network is then responsible for keeping the cell relations information table updated for each UE, meaning that the information about the private base station that the UE is allowed to access and the neighbouring cells is maintained. This could be stored in the Core Network CN or in the Radio Access Network RAN. The information about the cell relations would be similar as shown in the example in 2.

Other network elements—like a public NodeB—can ask the private base station to change interference reduction BCH mode. The reason may be that an active UE will soon start measuring for this private base station and it is therefore required to turn the BCH into normal mode. When the UE is in active mode, the position is known by the radio access network on a cell basis, and the proximity indication can be sent for example from the public eNodeB when the UE enters the cell that is in proximity of the private base station cell.

Another reason for having other network elements to change the interference reduction mode could be that the CN knows whether a UE is present in the network or not. If the UE is present in another TA/RA/LA than the TA/RA/LA where the private base station is, the network could ask the private base station to go into the maximum interference reduction mode, e.g. turning the BCH completely off. When the UE is detached from the network, the private base station could be asked to ramp up the transmission power, in case the UE is trying to attach to the network again at home. For example, this could be the case when the UE is running out of battery power and is not recharged until getting home.

For UEs in idle mode the proximity indication could also be sent when a UE enters the RA or TA that is covering the same geographical area as the private base station is covering. Since the RA or TA can have a rather large coverage area this might not be so power efficient.

At TA/RA/LA update, when the UE enters a particular TA/RA/LA, the UE could be commanded to do a control plane procedure, e.g., a cell update either for every new cell or when entering a particular cell, or any cell in a list of particular cells, or a tracking area update. Thereby the radio access network could get better proximity detection when the UE is getting close to a private base station.

In an embodiment of the disclosure the macro NodeB sends a proximity indication to the private base station based on the presence indication of a specific UE.

In case of private base station for UTRAN there is a need for backwards compatibility to support UEs supporting earlier releases of the standards. These UEs cannot be aware of any restricted access permissions in idle mode and therefore we would have to make sure the mode change does not affect the UEs performance.

In active mode the UTRAN supports soft handover, so in the case of a public access to the private base station the BCH would have to be turned on whenever there is any UE activity in the neighbouring cells.

Figure 5:
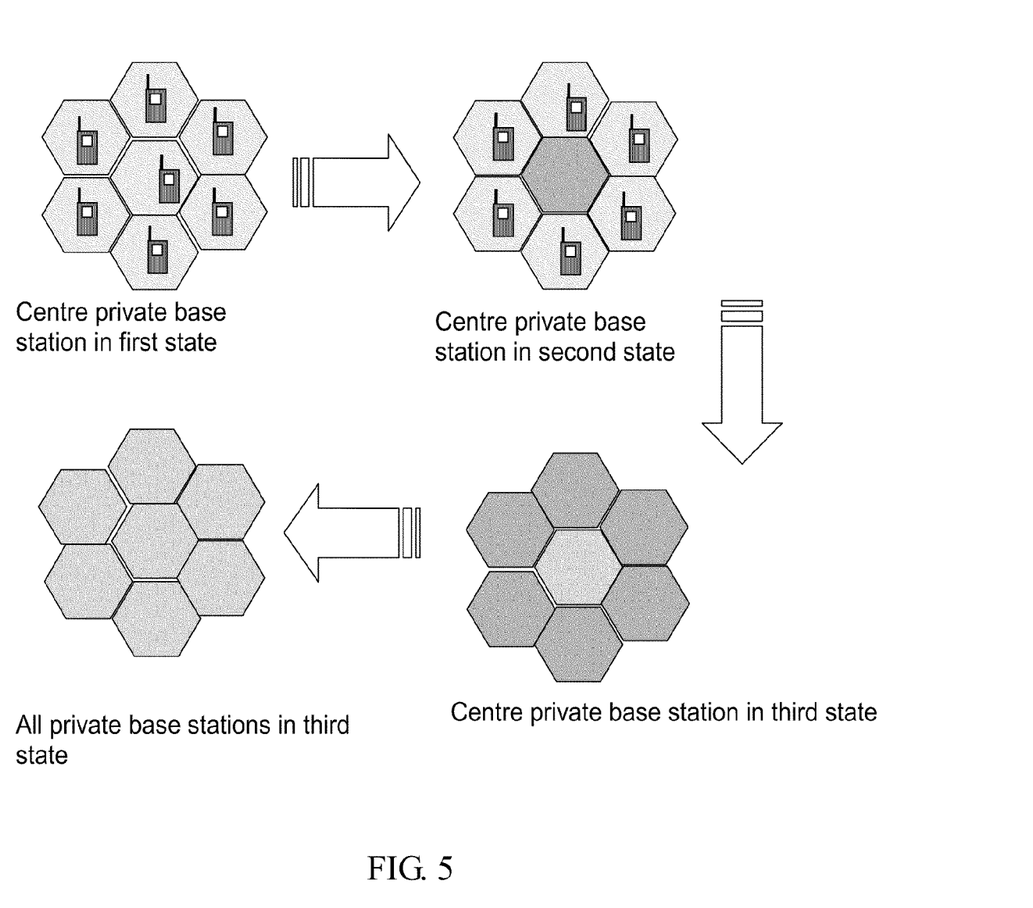
FIG. 5 schematically shows an example of two-step BCH interference reduction mode change in case of neighboring activity.

FIG. 5 shows an example of two-step BCH interference reduction mode change in case of neighbouring activity here exemplified with seven private base station cells. This is useful when requiring soft-handover as the private base station is powered up before the UE enters its cell.

Firstly, when all private base stations have UEs active in their cell, all said private base stations are in a first state, i.e., all are in an active state.

Secondly, when there is no UE present in the centre private base station cell, said private base station will change the mode to an intermediate interference reduction mode and inform its neighbouring cells about the state change as shown in the figure. Thus, when all the UEs leave or turn off for a while, the private base station enters this mode. This second state is characterized by an indicating phase where the neighbouring cells are informed about the lack of UEs.

Thirdly, when all other neighbour cells also have turned into said second state, the private base station can go into the next state of BCH interference reduction. Thus, when no private base station has any active UEs, i.e when the centre private cell has no neighbour cells in first state, then private base station in said centre private cell can turn to a third power reduction state. The third state is characterized by reduced BCH power.

In the opposite direction, the private base station would go from the interference reduction mode characterized by the third state when receiving an indication from any of its neighbouring cells that a UE is present in that cell. The private base station then turns on the BCH to ensure the UE in the other cell can read its information and sends an indication to all its neighbouring cells. If the UE enters the cell of the private base station it will go in to the active state and inform its neighbour cells about the mode change or it will go back to the interference reduction mode in case all the neighbouring cells are in the second state.

In another embodiment of the disclosure the private base station may detect that a UE that can use the private base station is within the private base station coverage area. The private base station thus has to detect and receive transmission from a particular UE. The benefit of this approach is that being a network implementation, it may also work for legacy UEs, and provide very good interference reduction, as the private base station can simply turn all its transmission off when no interesting UE is nearby.

In order to detect UE transmission, the private base station needs to receive information on what to listen to, and possibly when to listen (timing). This information could be provided from other network elements controlling a current radio transmission for the UE. This may contain information about time/frequency slot and/or UE specific scrambling codes, UE transmission of uplink reference symbols, pilots etc. The private base station can then determine if the UE is in the vicinity. The private base station could then change mode based on this. This approach could be applied both in Idle mode and in active mode. In active mode, even when in UE power saving state with long DRX cycle, there is regular control signalling. In Idle mode there is usually also regular control signalling, e.g., periodic TA/LA/RA update for supervision. A complication for Idle mode is that the UE might be using a uplink common control channel, where the UE cannot be identified by the radio access network by physical layer addressing. In this case, anyway the private base station could have been provided the full configuration of the common control channel and in addition any UE specific information that is needed to identify a certain UE as a sender, and/or to decode any needed higher layer information in the UE transmission.

The private base station device may have its own presence detector, e.g., a motion detector or a sound detector—detecting that people are in the vicinity, alternatively it could have another wireless detection mechanism that correspond to a UE function, e.g., a short range radio, WiFi, Bluetooth, IR etc that can detect that a UE is nearby. The private base station may then also inform the other network element that it can hear this UE.

The network node generating the proximity indication could also be an external node, identifying the user presence in the coverage area of the private base station cell. Examples of these external proximity detectors could be burglar alarms, e.g., motion detectors, alarm activation/de-activation, garage port activation, electronic key system, car detection, refrigerator opening detector, plumbing/toilet activity detector, sound detector, Stereo/radio/pc/light on detector etc.

When a UE is using a cell of a private base station (in idle mode or in active mode) but there is no user data transmission ongoing, nor any other signalling the information about the presence of the UE can be unknown to the private base station, since there is no activity.

In one embodiment of the disclosure when the UE is camping on a cell of a private base station in idle mode, the UE periodically updates the private base station only (not the CN) to inform the private base station that this UE is still camping on this private base station. The UE may attach additional information about the radio environment to this message. This information could for example be measurements of neighbouring cells, which would enable the private base station to get a better understanding of the coverage situations, since there is a difference in requirements depending on whether the private base station is covering the same area as the larger normal cells or if the coverage is completely separate, as described before.

A timer may also be used to step between states:

When not receiving a periodic update from any UE within a certain time the private base station can assume there is no UE there, after which it can increase the DTX period or switch off the BCH.

When not receiving an access from a specific UE within some time, increase power or reduce DTX period.

The private base station may inform other network elements (when changing, periodically or when asked) what the current mode is. This will be helpful for the other elements when setting up handover measurements. Information of a mode change in the private base station may be sent to other network nodes.

The invention claimed is:

1. A method for transmission mode change in a telecommunication network, wherein a public network comprises at least one public base station (NB) covering a public cell and a private network comprises at least one private base station (PBS) covering a private cell, wherein said at least one private base station has limited access rights for User Equipments (UEs) in the private network, and where said UEs are able to also communicate with the public network;

the method comprising: when the private base station is in an interference reduction transmission mode,
performing a private base station transmission mode change to an active transmission mode when a UE with access rights to said private base station is detected in proximity of said private base station, where a detection of said proximity is based on information being specific for said UE and its relation to said private base station.

2. The method as claimed in claim 1, wherein said detection of said proximity, for a particular one of said at least one private base station, is based on a cell relation between a private cell, covered by said particular private base station, and other public or private cells in a vicinity of the private cell.

3. The method as claimed in claim 1, wherein the private base station when in active transmission mode performs a mode change to an interference reduction transmission mode when no UE with access rights to said private base station is detected in proximity of said private base station; or
the private base station when in active transmission mode performs a mode change to an interference reduction transmission mode when all UEs with access rights to said private base station are detected outside the private cell of the private base station.

4. The method as claimed in claim 1, wherein the private base station when in active transmission mode performs a multi-step mode change to an interference reduction transmission mode, wherein the private base station passes an intermediate interference reduction transmission mode.

5. The method as claimed in claim 1, wherein the private base station transmits common channels including a Broadcast Channel (BCH) having at least one of a discontinuous transmission (DTX) pattern in interference reduction transmission mode and a reduced power in interference reduction transmission mode.

6. The method as claimed in claim 1, wherein the UE with access rights to said private base station is detected in proximity of said private base station by said UE.

7. The method as claimed in claim 6, wherein the proximity is detected based on storing and recognizing information in the UE regarding cells that are neighbours to or in the vicinity of the particular private base station.

8. The method as claimed in claim 7, wherein said information is collected by the UE by reading information from at least one of the nearby cells while camping on the private base; and
the telecommunication network based on a network model.

9. The method as claimed in claim 6, wherein said information is based on a location application in the UE.

10. The method as claimed in claim 6, wherein said information is based on detection of electronic equipment; and wherein said electronic equipment is one of the electronic equipments in the group: a UE application; and a local radio network.

11. The method as claimed in claim 1, wherein the UE with access rights to said private base station is detected in proximity of said private base station by the Network.

12. The method as claimed in claim 11, wherein the proximity to said private base station is detected by one of the Public base station, a core network node, and another Private base station.

13. The method as claimed in claim 11, wherein the proximity is detected based on storing and recognizing information regarding the UE and cells that are neighbours to or in the vicinity of the particular private base station.

14. The method as claimed in claim 13, wherein the proximity is detected based on recognizing a radio transmission comprising the UE and a cell being neighbour to or in the vicinity of the particular private base station; or
wherein the proximity is defined as the UE being engaged in a radio transmission with a cell being neighbour to or in the vicinity of the particular private base station; or
wherein the proximity is detected based on detection of the UE by one of a local radio network and an electronic entity on the private base station.

15. The method as claimed in claim 1, wherein the proximity is defined as the UE entering a cell being neighbour to or in the vicinity of the particular private base station.

16. The method as claimed in claim 1, wherein information of a proximity indication is signalled to the private base station.

17. A telecommunication system in a telecommunication network, the telecommunication network having a public network comprising at least one public base station (NB) covering a public cell and a private network comprising at least one private base station (PBS) covering a private cell, wherein said at least one private base station has limited access rights for User Equipments (UEs) in the system, and where said UEs are able to also communicate with the public network,
the system comprising means for receiving a proximity indicator triggering a mode change of the private base station from an interference reduction transmission mode to an active transmission mode when a UE with access rights to said private base station is detected in proximity of said private base station, wherein a detection of said proximity is based on information being specific for said UE and its relation to said private base station.

18. The telecommunication system as claimed in claim 17, wherein said detection of said proximity, for a particular one of said at least one private base station, is based on a cell relation between a private cell, covered by said particular private base station, and other public or private cells in a vicinity of the private cell.

19. The telecommunication system as claimed in claim 17, wherein the means for receiving a proximity indicator comprises at least one of the private base station, another private base station, the telecommunication network, a public base station, and a core network node.

20. The telecommunication system as claimed in claim 17, wherein the proximity indicator is sent from an User Equipment (UE) having access rights to the private base station (PBS) when the UE recognizes information regarding cells that are neighbours to or in the vicinity of the particular private base station, or when the UE detects proximity to the private base station based on a location application in the UE, or when the UE detects proximity to the private base station based on detection of electronic equipment.

* * * * *